United States Patent
Ransom et al.

(10) Patent No.: US 6,743,019 B2
(45) Date of Patent: Jun. 1, 2004

(54) METHOD AND APPARATUS FOR AIRCRAFT-BASED SIMULATION OF VARIABLE ACCELERATIONS AND REDUCED GRAVITY CONDITIONS

(75) Inventors: Stephen Ransom, Stuhr (DE); Manfred Zier, Ritterhude (DE)

(73) Assignee: Astrium GmbH, Ottobrunn (DE)

( * ) Notice: Subject to any disclaimer, the term of this patent is extended or adjusted under 35 U.S.C. 154(b) by 270 days.

(21) Appl. No.: 10/076,043

(22) Filed: Feb. 13, 2002

(65) Prior Publication Data

US 2002/0164559 A1 Nov. 7, 2002

(30) Foreign Application Priority Data

Feb. 13, 2001 (DE) .......................................... 101 06 516

(51) Int. Cl.⁷ ................................................. G09B 9/00
(52) U.S. Cl. .......................................... 434/34; 434/59
(58) Field of Search .............................. 434/29, 30, 34, 434/37, 55, 258, 365, 372; 244/1 R, 78, 118.1, 118.6, 121, 158 R, 160, 162; 165/104.31; 220/240; 472/59, 68, 118, 125, 131, 133; 62/55.5; 348/823, 824, 826

(56) References Cited

U.S. PATENT DOCUMENTS

| | | | | |
|---|---|---|---|---|
| 3,566,960 A | * | 3/1971 | Stuart .................... 165/104.31 |
| 3,568,874 A | * | 3/1971 | Paine et al. ................. 220/240 |
| 3,578,274 A | * | 5/1971 | Ginn et al. ............... 244/118.6 |
| 4,487,410 A | * | 12/1984 | Sassak ........................ 472/131 |
| 4,625,521 A | * | 12/1986 | Murphy et al. .............. 62/55.5 |
| 4,678,438 A | * | 7/1987 | Vykukal ....................... 434/34 |
| 5,085,382 A | * | 2/1992 | Finkenbeiner ........... 244/118.1 |
| 5,527,223 A | * | 6/1996 | Kitchen et al. .............. 472/118 |
| 5,531,644 A | * | 7/1996 | Marumo ....................... 472/68 |
| 5,718,587 A | * | 2/1998 | Sussingham .................. 434/34 |
| 5,848,899 A | * | 12/1998 | Howard ........................ 434/34 |
| 5,971,319 A | * | 10/1999 | Lichtenberg et al. ....... 244/1 R |
| 6,144,417 A | * | 11/2000 | Yanagisawa ................. 348/823 |
| 6,440,002 B1 | * | 8/2002 | Jackson ....................... 472/118 |
| 2003/0113695 A1 | * | 6/2003 | Lee et al. .................... 434/258 |

OTHER PUBLICATIONS

"Microgravity Laboratories—Zero Gravity Reasearch Facility", NASA Library, Jun. 1994, 6 pages.*
"Virtual Environment for Aerospace Training" by R. Bowen Loftin, Dept. of Natural Science, University of Huston–Downtown, WESCON1994, p. 31–34.*
"Intelligent Control of a Planning System for Astronaut Training" by James Ortiz et al, IEEE Transactions on Aerospace and Electronic System, vol. 35, No. 3, Jul. 1999, p. 1055–1070.*
"Microgravity: Fall Into Mathematics" and "Instructional Materials: Microgravity", NASA Library, Jan. 2000, 17 pages.*

* cited by examiner

Primary Examiner—Joe H. Cheng
(74) Attorney, Agent, or Firm—W. F. Fasse; W. G. Fasse

(57) ABSTRACT

A test chamber is pivotably suspended in an aircraft, so that the center of gravity of the test chamber always self-actingly orients itself in the direction of the effective residual acceleration. To simulate a selected acceleration greater than 0 g and less than 1 g, the aircraft is flown along a parabolic flight path with a downward vertical acceleration such that the difference between Earth's gravitational acceleration and the aircraft's acceleration corresponds to the selected acceleration to be simulated. To simulate gravitational conditions on Mars, the aircraft is flown with a downward vertical acceleration of about ⅔ g, so that the residual acceleration acting on the test chamber is about ⅓ g. The atmospheric conditions, such as the gas composition, pressure and temperature, of Mars can also be established in the test chamber.

22 Claims, 4 Drawing Sheets

METHOD AND APPARATUS FOR AIRCRAFT-BASED SIMULATION OF VARIABLE ACCELERATIONS AND REDUCED GRAVITY CONDITIONS

PRIORITY CLAIM

This application is based on and claims the priority under 35 U.S.C. §119 of German Patent Application 101 06 516.7, filed on Feb. 13, 2001, the entire disclosure of which is incorporated herein by reference.

FIELD OF THE INVENTION

The invention relates to a method and an apparatus for simulating variable accelerations between 0 g and 1 g (where "g" is Earth's gravitational acceleration), and especially for simulating reduced gravity conditions, for example as exist on the surface of planets such as Mars. The invention especially relates to carrying out such simulations using a parabolic flight path of an aircraft.

BACKGROUND INFORMATION

In order to simulate, test and evaluate the operation of devices, equipment and processes that are to operate on the surface of the planet Mars, in the scope of a manned or unmanned mission, it is necessary to simulate the environmental conditions prevailing on Mars as completely and accurately as possible here on Earth. While the atmospheric or environmental conditions (e.g. temperature, gas composition, pressure, etc.) prevailing on the surface of Mars can be relatively easily simulated in suitable test chambers, it is rather problematic to simulate the small gravitational acceleration of only 3.72 m/s$^2$, i.e. approximately ⅓ g (or somewhat more accurately ⅜ g), which prevails on the surface of Mars.

The standard gravitational acceleration at the Earth's surface, namely g, is approximately 9.81 m/s$^2$. Thus, any gravitational acceleration condition deviating from the Earth's gravitational acceleration g will require simulation efforts that overcome or interact with the Earth's normal gravitational field. Various methods for such simulation of different accelerations are known. For example, it is known to use centrifuges to generate accelerations, i.e. simulated gravitational conditions, greater than Earth's normal gravitational acceleration g. In such centrifuge methods, the artificial elevated acceleration can be established and maintained for essentially any desired duration. These centrifuge methods cannot, however, realize accelerations less than 1 g, because they always involve superimposing an additional acceleration on the basic 1 g gravitational acceleration. Thus, such methods are not suitable for the field of application of interest for the present invention.

For simulating accelerations between 0 and 1 g, it is also known to use drop towers or fall towers, from which test specimens or test capsules can be dropped toward the Earth under the influence of the Earth's gravitational acceleration, with a selected braking or resistance against the acceleration. In this manner, weightless (0 g) conditions or reduced gravity conditions can be achieved for a duration of up to approximately 5 seconds. For example, such drop towers or fall towers can realize a residual weight of ⅓ g, by braking or decelerating the falling test capsule corresponding to an acceleration of ⅔ g against or contrary to the Earth's acceleration toward the Earth. This braking can be carried out either actively or passively, for example by means of a counterweight connected to the test capsule by a cable over a roller or pulley, so that the counterweight is lifted while the test capsule falls. For an acceleration of ⅓ g, the fall times that can be achieved, e.g. for a tower height and falling distance of 100 m, are thus approximately 5.5 seconds. Trying to achieve longer fall times with a higher tower or the like is impractical. Moreover, the test capsule released from such a drop or fall tower typically must be subjected to a rather hard or intensive braking phase with a considerable braking shock at the end of the fall time. Such a braking shock exerts a correspondingly strong deceleration onto the test capsule, which can damage any equipment in the test capsule and could endanger test personnel if they were to be present in the test capsule.

A further possibility for generating accelerations between 0 and 1 g is seen in the use of so-called atmospheric drop capsules or fall capsules, which are dropped from an aircraft or the like at a high altitude and which generally include an active arrangement for compensating the atmospheric resistance. It is theoretically conceivable, but not known to exist yet in the prior art, to equip such fall capsules with an active braking system so that they fall toward the Earth with an acceleration corresponding to ⅔ g so as to experience a residual weight of ⅓ g. For such a fall capsule being dropped from an elevation of 8000 meters, the desired acceleration of ⅓ g could be achieved for a fall duration of approximately 40 seconds. It is further significant that manned atmospheric fall capsules have not yet become known in the prior art, presumably because their realization would be extremely complicated and costly due to the safety requirements that would have to be met.

It is further known to carry out a parabolic flight path with an appropriately equipped aircraft for achieving weightlessness, or so-called 0 g (zero g) conditions, for a duration of up to approximately 25 seconds. In this context, the aircraft flies on a so-called parabolic projectile trajectory, namely the trajectory path on which a non-propelled projectile would travel without any air resistance.

SUMMARY OF THE INVENTION

In view of the above, it is an object of the invention to provide a method of the type generally last mentioned above, using a parabolic flight path of an aircraft to achieve the simplest and most effective simulation of reduced gravity conditions, for example such as exist on the surface of Mars. It is another object of the invention to provide an apparatus or system for carrying out such a method. The invention further aims to avoid or overcome the disadvantages of the prior art, and to achieve additional advantages, as apparent from the present specification.

The above objects have been achieved according to the invention in a method for achieving variable accelerations greater than 0 g and less than 1 g, and especially for simulating the gravitational conditions on the surface of Mars, by flying an aircraft (and particularly a high capacity transport or cargo aircraft) on a parabolic flight path, with an acceleration relative to Earth that is equivalent to a falling acceleration of which the difference relative to the Earth's gravitational acceleration corresponds to the acceleration to be simulated.

The above objects have further been achieved according to the invention in a system for simulating a selected acceleration greater than 0 g and less than 1 g, comprising a transport aircraft having a payload space equipped with a test chamber that is movably mounted therein in such a manner, so that the center of gravity of the test chamber automatically or self-actingly is adjustable and orientable in the direction of the momentary effective residual acceleration.

According to the invention, an otherwise generally conventional transport or cargo aircraft having a sufficiently large cargo space or general payload space, is equipped with a test chamber that is movably arranged therein so that the test chamber can orient itself with respect to the effective residual acceleration acting thereon. This aircraft is then flown along a parabolic flight path, which especially corresponds to an external fall acceleration of $\frac{2}{3}$ g, so that an effective residual acceleration of $\frac{1}{3}$ g oriented toward the surface of the Earth remains effective as a residual weight on the test chamber and any test object arranged therein. In other words, the test chamber and any test objects arranged and supported therein will experience a gravitational condition corresponding to $\frac{1}{3}$ g. The inventive articulated or jointed suspension of the test chamber thereby serves to ensure that the residual weight in the test chamber is always oriented in a direction toward the center of the Earth, independently of the actual momentary flight attitude or orientation of the aircraft during its parabolic flight.

The duration of the $\frac{1}{3}$ g phase of the parabolic flight path depends on the height of this flight path. With a height difference of 3000 meters between the apex or zenith of the parabola and the starting altitude as well as the end altitude, this time duration will amount to approximately 55 seconds, while the aircraft's vertical speed at the beginning and the end of the parabolic flight path will respectively be about 180 m/s (upward and downward respectively). The braking or pull-out phase of the flight is carried out in a manner analogous to the known 0 g parabolic flights, and thus does not generate excessive g forces or cause any other problems for the equipment or personnel located in the test chamber.

The invention makes it possible to achieve not only an acceleration of $\frac{1}{3}$ g, but also any desired or selected acceleration value greater than 0 g and less than 1 g. Such acceleration or gravity conditions can be established and maintained as a test acceleration for a duration of about 60 seconds, so that various present-day devices and methods or processes can be operated to carry out the intended experiments or tests. Moreover, the duration and the gravity conditions are such that persons can be present in a suitably equipped test chamber before, during and after the test. The deceleration (or braking acceleration) at the end of the end of the parabolic flight phase can be maintained at a value below about 2 g, so as to avoid harm or discomfort to the persons involved in the test, and to avoid damage to the equipment. The aircraft may then return to the ground, or another test phase can be almost immediately repeated.

DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

A large volume or high capacity transport aircraft 1 has a payload or cargo space with a test chamber 2 installed therein. The test chamber 2 is generally in the form of a sphere with a diameter of about 3 to 4 m installed therein. Other test chamber geometries could be used alternatively, but a spherical test chamber is well suited to maintaining a pressure-tight enclosure to establish a desired atmospheric gas composition and pressure within the test chamber 2. By means of suitable equipment 16, such as cooling devices, heaters, gas supply tanks, a gas compressor, regulating valves, and the like, preferably arranged in an underfloor area 4 of the test chamber 2, it is possible to establish an environment within the chamber 2 that realistically simulates environmental conditions prevailing in the atmosphere of Mars, for example with regard to the gas composition of the atmosphere (e.g. about 95 vol. % carbon dioxide, about 2.7 vol. % nitrogen, about 1.6 vol. % argon, and small quantities of oxygen, water vapor, carbon monoxide, etc.), the temperature (e.g. in a range from −140 to 20° C.), the pressure (e.g. about 0.7 kilopascal), and other surface conditions of Mars. A representative test atmosphere may thus, for example, consist of carbon dioxide, nitrogen and argon making up more than 95 vol. % and other remainder constituents making up less than 5 vol. %, at an atmosphere pressure of less than 1 kilopascal. According to the invention, the gravitational conditions of Mars can also be simulated.

Figure 1:
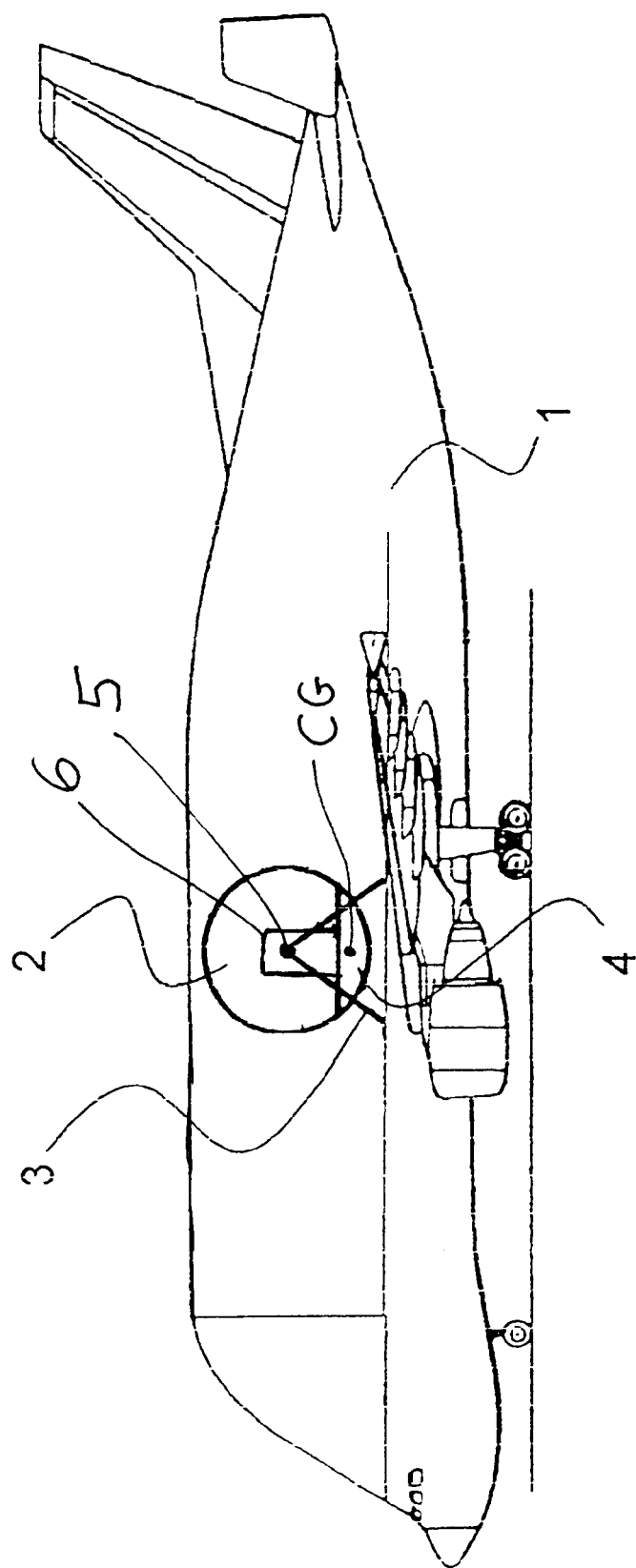
FIG. 1 is a schematic partially sectioned or ghost side view equipped with a test chamber for carrying out test flights to simulate conditions prevailing on Mars, according to the invention.
Figure 2:
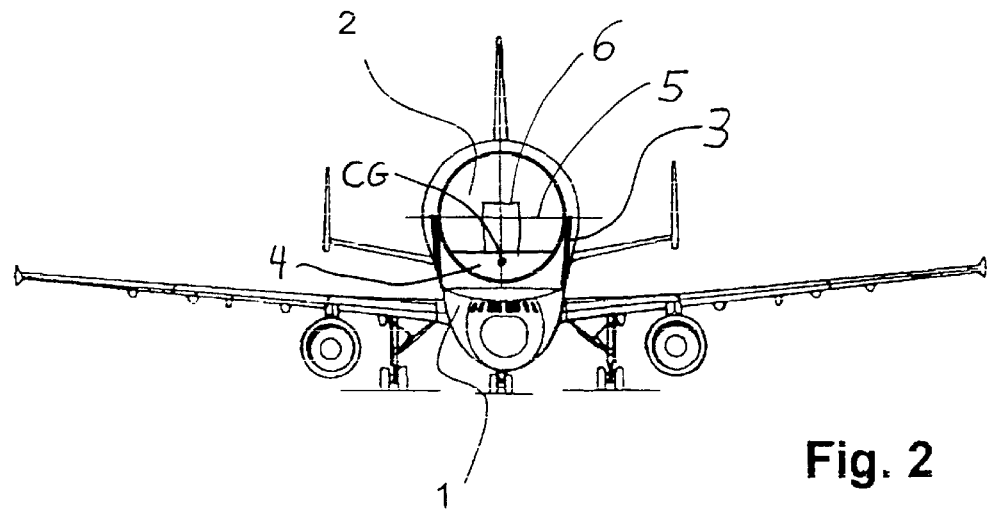
FIG. 2 is a schematic partially sectioned or ghost front view of the aircraft of FIG. 1.

The test chamber 2 is mounted and supported on a support or suspension arrangement 3 that is freely pivotable about at least one axis 5, 5', 5". The embodiment shown in FIGS. 1, 2 and 3 comprises a simple suspension with only a single pivot axis 5, providing only one degree of freedom for the pivoting of the chamber 2. This pivot axis 5 corresponds with or is aligned with the aircraft transverse axis, i.e. the pitch axis, so that the variations of the pitch of the aircraft longitudinal axis relative to the direction of Earth's gravitational attraction (vertically downward) during the flight are isolated from the test chamber 2. In other words, the pitch orientation of the chamber 2 is independent of the pitch attitude of the aircraft 1.

Figure 4:
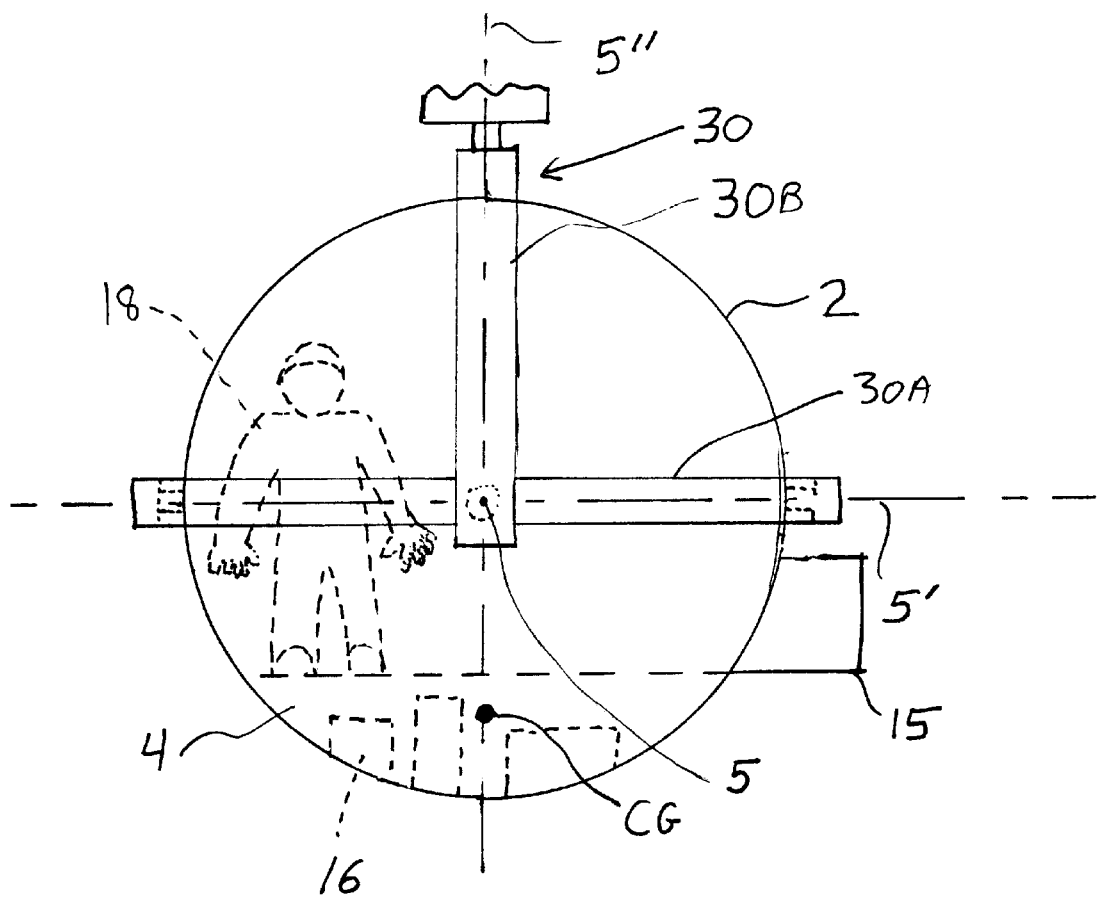
FIG. 4 is a schematic side view of a test chamber with a different suspension arrangement.

FIG. 4 schematically shows an embodiment with a more complex Cardanic gimbal suspension 30, which hangingly supports the test chamber 2 from the airframe of the aircraft 1 above the chamber 2. The gimbal suspension 30 includes a circular frame 30A encircling the girth of the test chamber 2, and a semicircular frame 30B connecting the circular frame 30A to the overhead supporting structure. The test chamber 2 is pivotably supported on the circular frame 30A, to allow the chamber 2 to freely pivot about a longitudinal pivot axis 5'. The circular frame 30A is pivotably supported by the semicircular frame 30B, so as to allow the test chamber 2 and the circular frame 30A therewith to pivot about the transverse pivot axis 5. Furthermore, the semicircular frame 30B is pivotably supported from the overhead support structure, to allow the entire arrangement to freely pivot about an upright (or yawing) pivot axis 5". Such an arrangement allows a complete isolation of the test chamber 2 from the pitching, rolling and yawing movements and resulting attitude of the aircraft. A further alternative suspension provides only two pivot axes, i.e. two pivoting degrees of freedom, such as the axes 5 and 5'.

The center of gravity CG of the test chamber 2 is located below the respective pivot axis or pivot axes 5, 5', 5", so that the test chamber 2 will always automatically or self-actingly orient itself in a vertically upright orientation with the center of gravity CG directed toward the center of the Earth, due to the effective or residual gravity acting on the test chamber 2 during the test flight of the aircraft 1, for example a residual gravity of about ⅓ g. The flight path of the aircraft is controlled to minimize or avoid horizontal acceleration components (fore-aft and laterally) so that the resultant or residual gravity acting on the test chamber 2 is directed purely vertically downward toward the center of the Earth. The location of the center of gravity CG is selected and established as desired, by arranging the necessary subsystems and equipment 16, such as heaters, cooling devices, data acquisition and data transmission devices for acquiring test data and transmitting these to the outside of the chamber 2, and the like, in the underfloor area 4 of the chamber 2.

Any desired test object 6, such as a Mars lander module, or Mars surface test equipment, can be mounted on the floor in the test chamber 2, and will be subjected to the environmental conditions and gravitational conditions established in the chamber 2. As merely schematically indicated in FIG. 4, the chamber 2 may further be equipped with an air lock 15 through which devices, equipment, or even testing personnel dressed in pressure and exposure protection suits 18, can enter into or exit out of the chamber 2.

As soon as the aircraft 1 and the test chamber 2 have been prepared, the aircraft 1 will take off from the Earth and climb to the nominal initial altitude predetermined for beginning the test flight. Then the aircraft 1 begins an accelerated descent in order to achieve the required speed for carrying out the test flight. Once the required speed is achieved, the actual test flight along the defined parabolic flight path will begin by climbing along a parabolic arc, for achieving the desired residual or resultant test acceleration, for example with a magnitude of ⅓ g.

Figure 5:
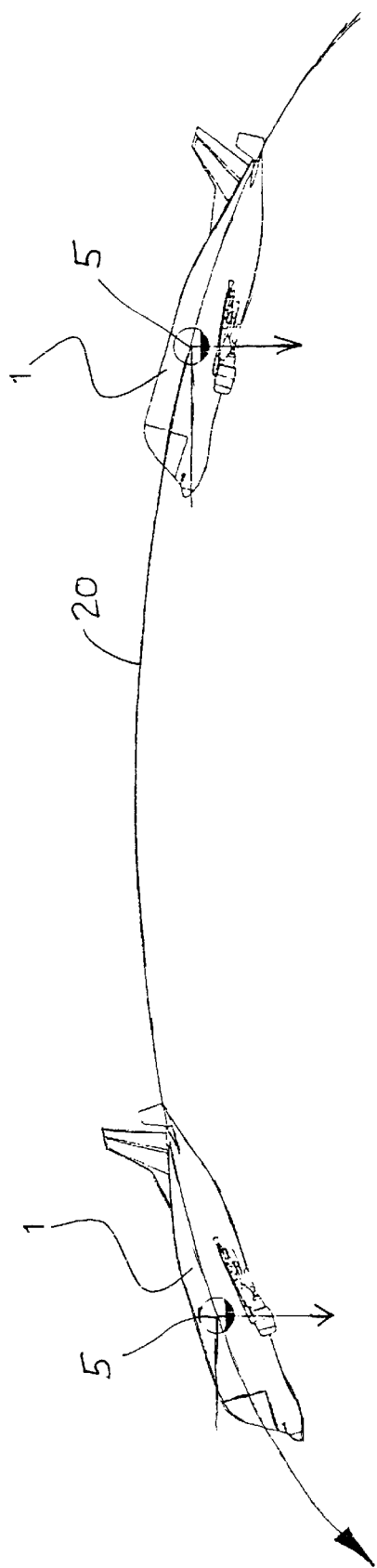
FIG. 5 is a schematic side view of a parabolic flight path for achieving reduced gravity conditions according to the invention.

FIG. 5 shows a representative parabolic flight path 20. At the right side of FIG. 5, the aircraft is ascending or climbing on an ascending portion of the parabolic flight path 20. During this climbing portion of the parabolic flight path 20, the aircraft's horizontal speed is maintained constant, while the positive or upward vertical speed is uniformly reduced at a constant rate (acceleration) corresponding to the intended aircraft acceleration for achieving the prescribed residual or resultant test acceleration. Once the aircraft 1 reaches the apex of the parabolic flight path, at which point the vertical speed is zero, the horizontal speed will continue to be maintained constant, while the vertical speed will be increased ever more negative or downward, at a constant rate (acceleration) also corresponding to the intended aircraft acceleration. At the beginning and at the end of the parabolic flight path 20, the magnitude of the vertical speed of the aircraft 1 is identical, whereby only the direction or sign of the vertical speed has changed from positive/upward to negative/downward.

The constant rate of change of the aircraft vertical speed from a positive upward vertical speed at the beginning of the parabolic flight path 20, to a negative downward vertical speed at the end of the parabolic flight path 20 defines the vertical acceleration of the aircraft 1. This rate of change of the aircraft's vertical speed, i.e. the vertical acceleration of the aircraft, is controlled so that the difference between the Earth's gravitational acceleration and the aircraft's acceleration gives the intended residual or resultant test acceleration that acts on the test chamber 2 and the test object 6 arranged therein. The "difference" between the Earth's gravitational acceleration and the aircraft's vertical acceleration along the parabolic flight path 20 could also be regarded as a superimposing of the aircraft's vertical acceleration on the Earth's gravitational field. It is essentially merely a semantic matter as to what sign (either positive or negative) is applied respectively to the Earth's gravitational acceleration and to the aircraft's vertical acceleration. In any event, it is clear that the parabolic flight path of the aircraft involves a downward vertical acceleration of the aircraft, namely a negative change of the rate of climb during the course of the parabolic flight path, which is manifested as a progressive reduction of an upward vertical speed during the ascending half of the parabolic path followed by a steadily increasing downward vertical speed during the descending half of the parabolic path of the aircraft.

During the flight along the parabolic flight path 20, the aircraft is flown and controlled to achieve the desired downward vertical acceleration (e.g. by reducing engine power and/or pitching down), while minimizing or avoiding fore-and-aft and transverse accelerations. This can be achieved manually by means of normal flight control inputs by a pilot of the aircraft, or automatically by means of an autopilot computer controller 7, which automatically controls and adjusts the engine power and the control surfaces 11 of the aircraft to achieve the desired constant downward vertical acceleration, according to a preprogrammed or input flight control routine for the intended parabolic flight path 20.

Figure 3:
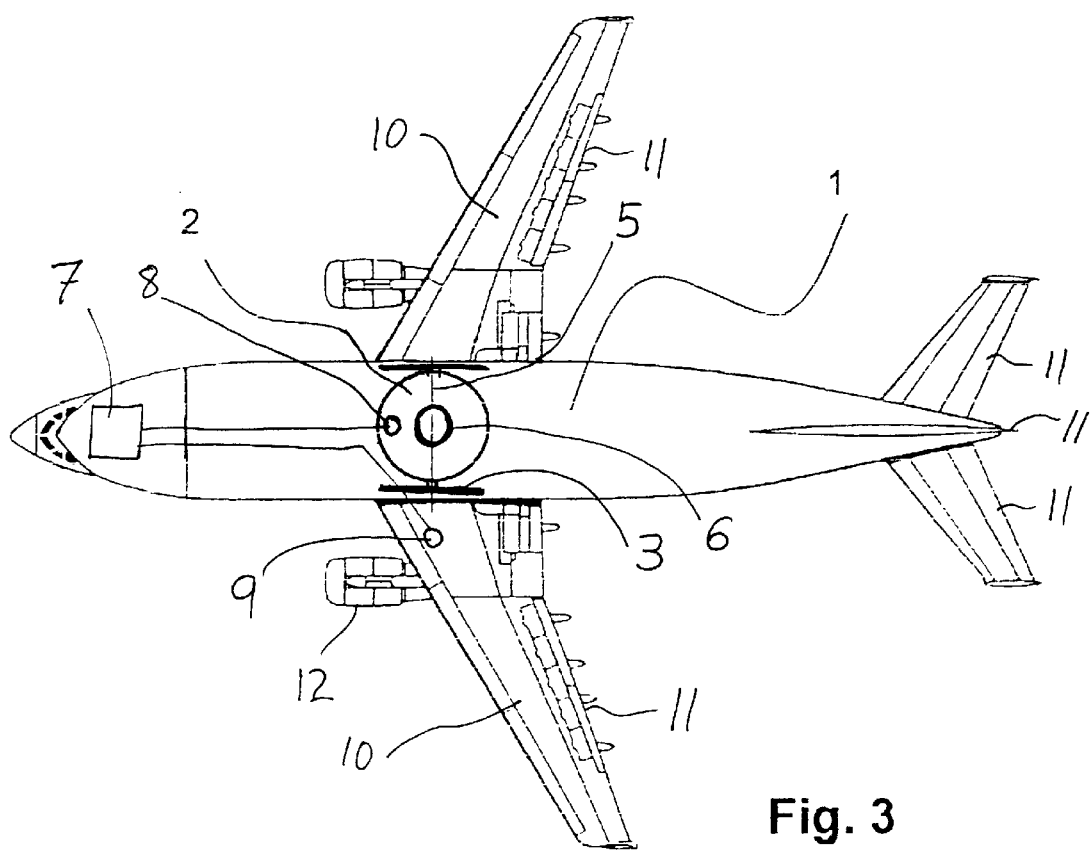
FIG. 3 is a schematic partially sectioned or ghost top plan view of the aircraft of FIG. 1.

As schematically shown in FIG. 3, the autopilot computer controller 7 can receive an instantaneous vertical acceleration signal from an acceleration sensor 8 arranged in the aircraft 1, or especially in the test chamber 2. Thus, the flight attitude and control condition of the aircraft 1 can be automatically adjusted in the event of any deviation of the actual acceleration effective on the test chamber 2 from the desired test acceleration. A further alternative involves the use of one or more load sensors 9 arranged on the wings and the like of the aircraft, whereby the autopilot computer controller 7 takes into account the instantaneous wing loading for controlling the flight of the aircraft. For example, the desired vertical test acceleration, and the corresponding change of the vertical speed, can be achieved by adjusting the control surfaces 11 and the power of the engines 12 of the aircraft so that the vertically directed lift generated by the aircraft 1, and predominantly by the wings 10 thereof, is maintained at ⅓ of the total loaded aircraft weight, during the entire test flight along the parabolic flight path 20. If the total generated vertical component of lift corresponds to ⅓ of the total loaded aircraft weight at any time, then the residual or resultant vertical acceleration acting on the test chamber 2 will correspond to the desired value of ⅓ g.

At the end of the parabolic flight path 20, i.e. at the left side of FIG. 5, the aircraft 1 is caught or pulled up out of the resulting descent and can then either repeat the parabolic flight path sequence, or can continue on its flight or return back to the Earth.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system for simulating a selected acceleration greater than 0 g and less than 1 g, comprising:
   an aircraft having a cargo space therein;
   a test chamber that encloses a test chamber space therein, has a center of gravity, and is arranged in said cargo space; and
   a suspension arrangement that includes at least one pivot axis and that movably supports said test chamber in said cargo space to allow said test chamber to self-actingly pivot about said at least one pivot axis so as to orient said center of gravity in a direction of an effective residual acceleration acting on said test chamber, which corresponds to a difference between Earth's gravitational acceleration and a vertical acceleration of said aircraft being flown on a parabolic flight path;
   wherein said effective residual acceleration defines said selected acceleration.

2. The system according to claim 1, wherein said at least one pivot axis of said suspension arrangement consists of a total of exactly one pivot axis.

3. The system according to claim 2, wherein said pivot axis of said suspension arrangement is aligned with a transversely extending pitch axis of said aircraft.

4. The system according to claim 1, wherein said suspension arrangement comprises a Cardanic gimbal mount, and said at least one pivot axis includes two mutually perpendicular transverse and longitudinal pivot axes aligned with respective transverse and longitudinal axes of said aircraft.

5. The system according to claim 4, wherein said at least one pivot axis further includes a third pivot axis that is orthogonal to said transverse and longitudinal pivot axes.

6. The system according to claim 1, wherein said test chamber comprises a spherical chamber wall.

7. The system according to claim 6, wherein said spherical chamber wall has an outer diameter in a range from 3 to 4 meters.

8. The system according to claim 1, wherein said test chamber comprises an air-tight, pressure-tight chamber wall enclosing said test chamber space therein.

9. The system according to claim 8, further comprising an air lock entrance through said chamber wall.

10. The system according to claim 8, further comprising a gas atmosphere consisting of predominantly carbon dioxide, nitrogen, argon, and less than 5 vol. % of other remainder constituents contained in said test chamber space, with an atmosphere pressure of less than 1 kilopascal.

11. The system according to claim 10, further comprising a pressure and exposure protection suit adapted for a person to wear inside said test chamber space.

12. The system according to claim 1, further comprising a temperature control apparatus respectively cooperating with said test chamber to establish in said test chamber space a temperature in a range from −140° C. to 0° C.

13. The system according to claim 1, wherein said aircraft includes an engine, wings and control surfaces, and further comprising an autopilot control computer connected for control signal transmission to said control surfaces and said engine, and an acceleration sensor arranged in said aircraft and connected for data signal transmission to said autopilot control computer.

14. The system according to claim 13, wherein said acceleration sensor is mounted on or in said test chamber.

15. The system according to claim 13, further comprising at least one wing load sensor arranged on at least one of said wings and connected for signal transmission to said autopilot control computer.

16. The system according to claim 13, wherein said autopilot control computer contains a control routine adapted to control said control surfaces and said engine so as to fly said aircraft with said vertical acceleration along said parabolic flight path such that said difference between Earth's gravitational acceleration and said vertical acceleration of said aircraft defines said effective residual acceleration corresponding to said selected acceleration effective on said test chamber.

17. A method of simulating a selected acceleration greater than 0 g and less than 1 g on a test object, comprising the steps:
   a) arranging said test object in a test chamber space of a test chamber that is pivotably mounted in an aircraft; and
   b) flying said aircraft in Earth's gravitational field along a parabolic flight path such that a difference between Earth's gravitational acceleration and a vertical acceleration of said aircraft along said parabolic flight path defines an effective residual acceleration that acts on said test object and that corresponds to said selected acceleration effective on said test object in said aircraft.

18. The method according to claim 17, wherein said selected acceleration corresponds to a gravitational acceleration existing at the surface of Mars.

19. The method according to claim 17, wherein said step b) is carried out such that said vertical acceleration of said aircraft corresponds to $2/3$ g and said effective residual acceleration acting on said test object is $1/3$ g directed toward the Earth.

20. The method according to claim 17, wherein said step b) is carried out such that said vertical acceleration of said aircraft corresponds to 6.1±0.1 m/s$^2$ directed toward the Earth, and said effective residual acceleration acting on said test object is 3.7±0.1 m/s$^2$ directed toward the Earth.

21. The method according to claim 17, wherein said flying of said aircraft with said vertical acceleration along said parabolic flight path is continued for at least 55 seconds.

22. The method according to claim 17, further comprising is establishing in said test chamber at least one of a temperature, an atmospheric pressure, and an atmospheric gas composition prevailing at the surface of Mars.

* * * * *

UNITED STATES PATENT AND TRADEMARK OFFICE
CERTIFICATE OF CORRECTION

PATENT NO. : 6,743,019 B2 Page 1 of 1
DATED : June 1, 2004
INVENTOR(S) : Ransom et al.

It is certified that error appears in the above-identified patent and that said Letters Patent is hereby corrected as shown below:

Column 8,
Line 53, before "establishing", delete "is".

Signed and Sealed this

Twenty-eighth Day of September, 2004

JON W. DUDAS
*Director of the United States Patent and Trademark Office*